United States Patent
Ezaki et al.

(10) Patent No.: US 10,148,471 B2
(45) Date of Patent: Dec. 4, 2018

(54) COMMUNICATION APPARATUS, COMMUNICATION METHOD AND COMMUNICATION SYSTEM

(71) Applicant: FUJITSU LIMITED, Kawasaki-shi, Kanagawa (JP)

(72) Inventors: Takato Ezaki, Yokohama (JP); Daisuke Jitsukawa, Adachi (JP); Shunsuke Iizuka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 93 days.

(21) Appl. No.: 14/995,158

(22) Filed: Jan. 13, 2016

(65) Prior Publication Data

US 2016/0211953 A1    Jul. 21, 2016

(30) Foreign Application Priority Data

Jan. 15, 2015  (JP) ................................. 2015-005718

(51) Int. Cl.
  *H04L 27/06*    (2006.01)
  *H04L 27/00*    (2006.01)
  *H04L 5/00*     (2006.01)

(52) U.S. Cl.
  CPC ........ *H04L 27/0014* (2013.01); *H04L 5/0048* (2013.01); *H04L 27/06* (2013.01)

(58) Field of Classification Search
  None
  See application file for complete search history.

(56) References Cited

U.S. PATENT DOCUMENTS

2001/0047424 A1* 11/2001 Alastalo ............... H04B 7/0842
                                                  709/236
2009/0080516 A1*  3/2009 Chang .................... G06T 9/001
                                                 375/240.03

(Continued)

FOREIGN PATENT DOCUMENTS

| JP | 2007-244772 A   | 9/2007 |
| JP | 2013-090084 A   | 5/2013 |
| WO | WO 2012/115192 A1 | 8/2012 |

OTHER PUBLICATIONS

Moose, Paul H., "A Technique for Orthogonal Frequency Division Multiplexing Frequency Offset Correction", IEEE Transactions on Communications, vol. 42, No. 10, pp. 2908-2914, Oct. 1994.

(Continued)

*Primary Examiner* — Ayanah S George
(74) *Attorney, Agent, or Firm* — Arent Fox LLP

(57) ABSTRACT

A communication apparatus includes a memory, and a processor coupled to the memory and configured to receive a first reception signal and a second reception signal in a first period, calculate a first phase rotation quantity between the first reception signal and the second reception signal, receive a third reception signal and a fourth reception signal in a second period, calculate a second phase rotation quantity between the third reception signal and the fourth reception signal, determine whether to compensate for a frequency offset of a fifth reception signal based on a difference between the first phase rotation quantity and the second phase rotation quantity, and when it is determined to compensate for the frequency offset of the fifth reception signal, compensate for the frequency offset of the fifth reception signal.

21 Claims, 9 Drawing Sheets

(56) References Cited

U.S. PATENT DOCUMENTS

| | | | | |
|---|---|---|---|---|
| 2009/0080576 A1* | 3/2009 | Xiang | ................ | H04L 27/2657 |
| | | | | 375/344 |
| 2009/0135978 A1* | 5/2009 | Chang | ................ | H04L 27/0014 |
| | | | | 375/371 |
| 2011/0261909 A1* | 10/2011 | Andgart | ................ | H04L 5/0007 |
| | | | | 375/341 |
| 2013/0094560 A1 | 4/2013 | Ezaki et al. | | |
| 2013/0322582 A1 | 12/2013 | Ishida | | |

OTHER PUBLICATIONS

Japanese Office Action of corresponding Japanese Patent Application No. JP2015-005718 dated Oct. 9, 2018.

\* cited by examiner

COMMUNICATION APPARATUS, COMMUNICATION METHOD AND COMMUNICATION SYSTEM

CROSS-REFERENCE TO RELATED APPLICATION

This application is based upon and claims the benefit of priority of the prior Japanese Patent Application No. 2015-005718, filed on Jan. 15, 2015, the entire contents of which are incorporated herein by reference.

FIELD

The embodiments discussed herein are related to a communication apparatus, a communication method and a communication system.

BACKGROUND

Wireless communication systems, such as a mobile phone system, a wireless local area network (WLAN), and the like are widely used nowadays. Also, in the field of wireless communications, in order to further improve communication speed and communication capacity, continuous discussions are being held on next-generation communication techniques. For example, in the 3rd Generation Partnership Project (3GPP), which is a standardization organization, standardization of a communication standard called Long Term Evolution (LTE), and a communication standard called LTE-Advanced (LTE-A), which is based on LTE, has been completed or is being studied.

In such a wireless communication system, a frequency offset or a frequency deviation sometimes occurs by the difference in the clock precision of a base station apparatus (hereinafter referred to as a "base station") and a terminal apparatus (hereinafter referred to as a "terminal"), and the influence of the Doppler effect of a radio signal. A frequency offset is observed as a phase rotation quantity in a baseband signal. This frequency offset sometimes has a great influence on the reception quality of a reception base station.

As a method of estimating a frequency offset, the following method is provided, for example. That is to say, a method is provided in which a correlation between reference signals received at different timings is calculated so that a phase rotation quantity in a reception interval is estimated.

At the reception base station, it is possible to remove a frequency offset by giving a phase rotation quantity in the opposite direction to the estimated phase rotation quantity to a reception signal, for example. Thereby, it is possible for the base station to obtain a reception signal from which the influence of the frequency offset is reduced.

As a technique for dealing with a frequency offset, the following technique is provided, for example. That is to say, a technique is provided in which a phase difference between reception signals is estimated based on the reference signals received at plurality of different reception intervals. Then in the technique, a phase difference candidate is selected among a plurality of combinations of the phase difference candidates formed by combining phase difference candidates selected for each of the plurality of reception intervals.

With this technique, it is possible to expand a frequency deviation range that is estimable based on a correlation between the reference signals received at different timings, for example. Related technical documents include P. Moose, "A technical for Orthogonal Frequency Division Multiplexing Frequency Offset Correction", IEEE Trans. Commun., vol. 42, no. 10, October, 1994, and Japanese Laid-open Patent Publication No. 2013-90084, the content of which is incorporated herein by reference in its entirety.

SUMMARY

According to an aspect of the present disclosure, a communication apparatus includes a memory, and a processor coupled to the memory and configured to receive a first reception signal and a second reception signal in a first period, calculate a first phase rotation quantity between the first reception signal and the second reception signal, receive a third reception signal and a fourth reception signal in a second period, calculate a second phase rotation quantity between the third reception signal and the fourth reception signal, determine whether to compensate for a frequency offset of a fifth reception signal based on a difference between the first phase rotation quantity and the second phase rotation quantity, and when it is determined to compensate for the frequency offset of the fifth reception signal, compensate for the frequency offset of the fifth reception signal.

The object and advantages of the present disclosure will be realized and attained by means of the elements and combinations particularly pointed out in the claims.

It is to be understood that both the foregoing general description and the following detailed description are exemplary and explanatory and are not restrictive of the present disclosure, as claimed.

DESCRIPTION OF EMBODIMENTS

A frequency offset sometimes converges in a completely different direction by the influence of interference. For example, if a terminal to be an interference source differs for each predetermined cycle, and a transmission signal sequence to be transmitted differs for each predetermined cycle, randomness is added, and thus the influence of interference is reduced. However, as in the case of the Physical Uplink Control Channel (PUCCH) of LTE, when the same transmission signal sequence is transmitted for each predetermined cycle, if interference occurs once by the transmission signal sequence, the interference continues to occur for each predetermined cycle.

For example, on a reference signal transmitted using the PUCCH, a base sequence to be a base of the reference signal and a cyclic shift sequence applied to the base sequence have a different hopping pattern for each cell in one wireless frame (10 ms) cycle. In this case, with respect to a reference signal transmitted by a certain terminal, if a reference signal transmitted by another terminal becomes an interference signal, for example, the signal has a low possibility of becoming an interference signal by a hopping pattern before a lapse of 10 ms. However, after the lapse of 10 ms, the other user transmits a reference signal having the same sequence before 10 ms with the same frequency and at the same timing, and thus the signal might be an interference signal again.

By the influence of such interference, the phase rotation direction and the phase rotation quantity of a baseband signal change, and the estimation of a frequency offset sometimes converges on a completely different phase. In such a case, it is difficult for the reception base station to correctly estimate the frequency offset. Thereby, it becomes difficult for the reception base station to correctly remove a frequency offset from a reception signal, and thus the reception characteristic of the reception signal is greatly influenced.

The above-described technique of selecting a phase difference candidate from a plurality of phase difference candidates is intended to expand the frequency offset range, for example. Thus the technique does not provide any solution to the problem of correctly removing a frequency offset from a reception signal when interference occurs.

First Embodiment

Figure 1:
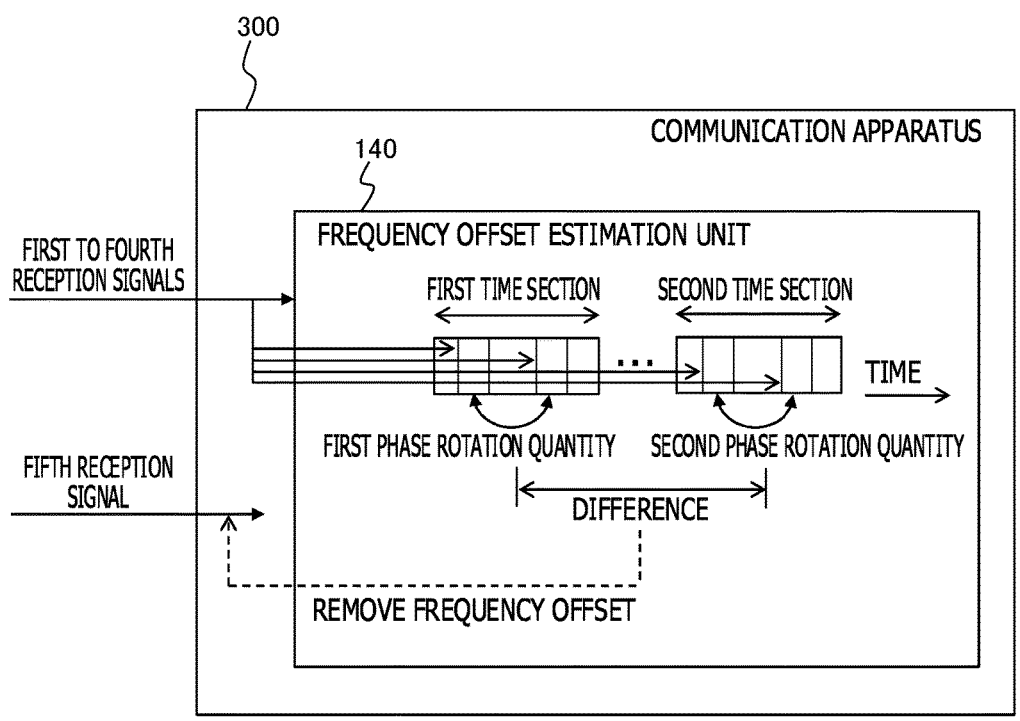
FIG. 1 is a diagram illustrating an example of a configuration of a wireless communication system.

A description will be given of a first embodiment. FIG. 1 illustrates an example of a configuration of a communication apparatus 300 according to a first embodiment. The communication apparatus 300 may be a base station apparatus or a terminal apparatus, for example. The communication apparatus 300 receives the first to fifth reception signals. The first to fifth reception signals are reception signals that are transmitted from the other communication apparatus, and received by the communication apparatus 300. For example, the first to fourth reception signals are reference signals, and the fifth reception signal is a data signal.

The communication apparatus 300 includes a frequency offset estimation unit 140. The frequency offset estimation unit 140 determines whether to remove a frequency offset from the fifth reception signal based on the difference between the first phase rotation quantity and the second phase rotation quantity.

The first phase rotation quantity represents the phase rotation quantity between the first and second reception signals received in the first time section. Also, the second phase rotation quantity represents the phase rotation quantity between the third and fourth reception signals received in the second time section.

For example, the frequency offset estimation unit 140 determines not to remove the frequency offset when the difference between the first phase rotation quantity and the second phase rotation quantity is equal to or more than a threshold value (which is also interchangeably referred to herein as a "certain value"). When the difference is equal to or more than the threshold value, the first and second phase rotation quantities differ by the threshold value or more, and in such a case, it is determined that the influence of interference is greater than a predetermined case. In this case, the frequency offset estimation unit 140 does not estimate the frequency offset using the first and second phase rotation quantities estimated at this timing, and the communication apparatus 300 does not remove the frequency offset from the fifth signal.

On the other hand, for example, when the difference between the first phase rotation quantity and the second phase rotation quantity is less than the threshold value, the frequency offset estimation unit 140 decides to remove the frequency offset. When the difference is less than the threshold value, the first and second phase rotation quantities are within a range smaller than the threshold value, and in such a case, it is determined that the influence of interference is less than that of a predetermined case. In this case, the frequency offset estimation unit 140 outputs the average phase rotation quantity of the first and second phase rotation quantities estimated at this timing to a frequency offset correction unit as a frequency offset estimation result. The frequency offset correction unit gives a phase rotation quantity having the opposite direction to the average phase rotation quantity to the fifth data signal in order to remove the frequency offset.

Accordingly, if the influence of interference is greater than a predetermined value, the estimation and the removal of the frequency offset is not carried out, and the estimation and the removal of the frequency offset is not carried out based on the phase rotation quantities that are completely different between the first time section and the second time section. On the other hand, if the influence of the interference is less than or equal to a predetermined value, the frequency offset is removed using the first and second phase rotation quantities estimated at this timing.

It is therefore possible for the communication apparatus 300 to correctly remove the frequency offset from the reception signal against the influence of the interference.

Second Embodiment

Next, a description will be given of a second embodiment.
Frequency Offset Calculation Method
First, a description will be given of a frequency offset (or frequency deviation, hereinafter referred to as a "frequency offset") with reference to FIG. 2.

Figure 2:
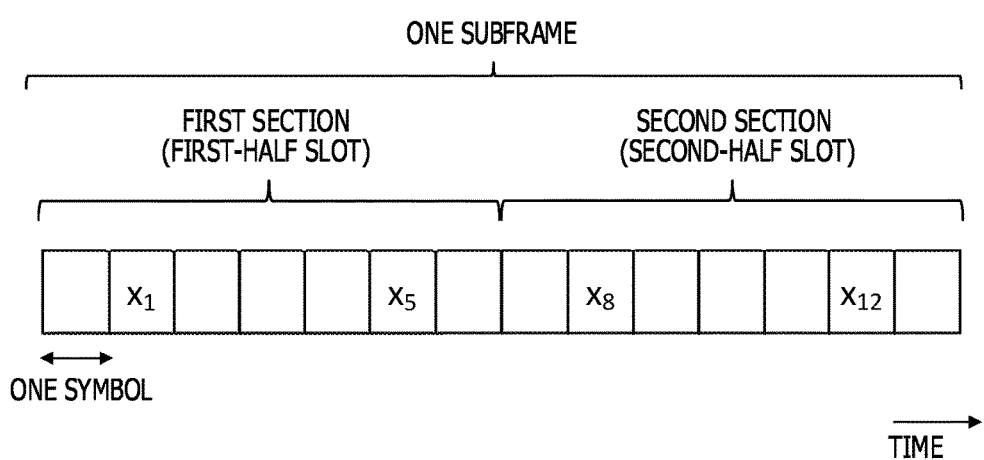
FIG. 2 is a diagram illustrating an example of a configuration of a subframe.

FIG. 2 illustrates an example of a configuration of one subframe of PUCCH in an LTE system. One subframe includes two slots, namely a first half slot and a second half slot, and each slot includes seven orthogonal frequency-division multiplexing (OFDM) symbols. Then 10 subframes constitute one wireless frame (10 ms).

For example, the first half slot may be a first time section (hereinafter referred to as a "first section"), and the second half slot may be a second time section (hereinafter referred to as a "second section").

FIG. 2 illustrates an example of a configuration of a subframe of the PUCCH format2, and a reference signal is transmitted using the second ("$x_1$" and "$x_8$") and the sixth ("$x_5$" and "$x_{12}$") symbols of each slot. As illustrated in FIG. 2, four reference signals are transmitted using the four symbols in one subframe. In this case, a signal sequence of the four reference signals is a completely different signal sequence by a predetermined hopping pattern, for example.

For example, it is thought that a certain terminal transmits four reference signal sequences using the four symbols illustrated in FIG. 2. It is assumed that the four reference signals are subjected to the same frequency offset.

In this case, the phase rotation between the two reference signals transmitted by the symbol "x$_5$" and the symbol "x$_1$", and the phase rotation between the two reference signals transmitted by the symbol "x$_{12}$" and the symbol "x$_8$" ought to have the same direction and the same quantity. That is to say, if the four reference signals are subjected to the same frequency offset, the two phase rotations in the first half slot section and the second half slot section ought to have the same rotation direction, and the same rotation quantity. In the second embodiment, in such a case, the influence of interference is small (or there is no influence of interference), and it is determined that the quantity and the direction of the two phase rotations are correctly estimated. In this case, processing for removing a frequency offset from the data signal is performed using the estimation result of the two phase rotations.

However, when the rotation directions of the two phase rotations of the first half slot section and the second half slot section are different, and the rotation quantities are greater than the threshold value, the estimation result of the two phase rotations is unlikely to be a correct result. In the second embodiment, in such a case, it is assumed that the phase rotations are different due to the influence of the interference. In this case, the processing for removing the frequency offset using the estimation result of the two phase rotations is not performed.

In the following, a description will be given of a method of calculating the frequency offset. First, a description will be given of a general example in which the communication method is not specified to be LTE, or the like.

It is assumed that the first reference signal (hereinafter sometimes referred to as a "transmission signal") of a terminal u in a section k is $s_{k,l}^{(u)}$. For example, the section k identifies each slot section, and the first section identifies each of a plurality of reference signals in each slot section. When U units of terminals transmit reference signals with the same frequency at the same timing, a reception signal $x_{m,k,l}$ at a reception antenna m of the base station is expressed as follows.

$$x_{m,k,l} = \sum_{u=1}^{U} e^{j\theta^{(u)}t(l)} h_{m,k}^{(u)} s_{k,l}^{(u)} + n_{m,k,l} \quad (1)$$

Here, $\theta^{(u)}$ represents the speed of the phase rotation by the frequency offset of the terminal u, t(l) represents time corresponding to the first reference signal, and $h_{m,k}^{(u)}$ represents a channel gain of the terminal u at the antenna m in the section k. Here, it is assumed that the channel gain $h_{m,k}^{(u)}$ is time invariant in the section k. Also, $n_{m,k,l}$ represents white Gaussian noise at the antenna m at timing t(l) in the section k.

In this regard, here for the sake of simplicity, a discussion will be held regarding the case where a transmission signal $s_{k,l}^{(u)}$ is a dimensionless scalar value. However, it is easy to expand the discussion to the transmission signal of vector values.

When the reference signal $s_{k,l}^{(1)}$ on the terminal "1" is removed from the reception signal $x_{m,k,l}$ represented by Expression (1), the following signal is obtained.

$$y_{m,k,l}^{(1)} = x_{m,k,l} s_{k,l}^{(1)*} = \quad (2)$$

$$e^{j\theta^{(1)}t(l)} h_{m,k}^{(1)} s_{k,l}^{(1)} s_{k,l}^{(1)*} + \sum_{u=2}^{U} e^{j\theta^{(u)}t(l)} h_{m,k}^{(u)} s_{k,l}^{(u)} s_{k,l}^{(1)*} + n_{m,k,l} s_{k,l}^{(1)*} =$$

-continued $$e^{j\theta^{(1)}t(l)} h_{m,k}^{(1)} + \sum_{u=2}^{U} e^{j\theta^{(u)}t(l)} h_{m,k}^{(u)} s_{k,l}^{(u)} s_{k,l}^{(1)*} + n'_{m,k,l}$$

The signal $y_{m,k,l}^{(1)}$ in Expression (2) represents a channel response of a propagation path, for example. In the second embodiment, the signal represented by Expression (2) is sometimes referred to as a signal after removal of transmission sequence (or signal after removal of sequence).

Where, it is assumed that the amplitude of the reference signal $s_{k,l}^{(1)}$ is 1. Also, n'$_{m,k,l}$ is a signal that has only a changed phase with respect to $n_{m,k,l}$, and thus it is possible to regard n'$_{m,k,l}$ as white Gaussian noise having the same statistical quality as that of $n_{m,k,l}$.

Where, descriptions will be given in the following of a behavior of the frequency offset estimation result in two cases, namely, the case where there is no terminal to be an interference terminal, and the case where there is an interference terminal.

1. When there is No Interference Terminal

When there is no interference terminal, the signal after the removal of sequence $y_{m,k,l}^{(1)}$ is represented as follows.

$$y_{m,k,l}^{(1)} = e^{j\theta^{(1)}t(l)} h_{m,k}^{(1)} + n'_{m,k,l} \quad (3)$$

Next, a correlation $z_{m,k}^{(1)}$ between the first (l=1) signal $y_{m,k,1}^{(1)}$ after the removal of the sequence in the section k and the second (l=2) signal $y_{m,k,2}^{(1)}$ after the removal of the sequence is calculated.

$$z_{m,k}^{(1)} = y_{m,k,1}^{(1)*} y_{m,k,2}^{(1)} = \left(e^{j\theta^{(1)}t(1)} h_{m,k}^{(1)} + n'_{m,k,1}\right)^* \left(e^{j\theta^{(1)}t(2)} h_{m,k}^{(1)} + n'_{m,k,2}\right) = \quad (4)$$

$$e^{j\theta^{(1)}(t(2)-t(1))} |h_{m,k}^{(1)}|^2 + N$$

The correlation $z_{m,k}^{(1)}$ between the two signals $y_{m,k,1}^{(1)}$ and $y_{m,k,2}^{(1)}$ after the removal of the sequence is calculated so that, for example, the phase rotation quantities of the two signals $y_{m,k,1}^{(1)}$ and $y_{m,k,2}^{(1)}$ after the removal of the sequence are calculated. In this manner, regarding the method of obtaining the phase rotation quantities of the two signals by calculating the correlation between the two signals, refer to P. Moose, "A technical for Orthogonal Frequency Division Multiplexing frequency offset Correction", IEEE Trans. Commun., vol. 42, no. 10, October, 1994, and the like, for example.

Then the average of the correlations $z_{m,k}^{(1)}$ among the reception antennas (1≤m≤M) is calculated so as to obtain the following.

$$\bar{z}_k^{(1)} \quad (5)$$

$$\bar{z}_k^{(1)} = \frac{1}{M} \sum_{m=1}^{M} z_{m,k}^{(1)}$$

Here, in Expression (4), N is a term having an average value of 0 including white Gaussian noise, and statistically approaches 0 when calculating an average sufficiently.

When an average $$\bar{z}_k^{(1)}$$

is sufficiently calculated, it is possible to represent the average as an expected value E[ ], and thus Expression 6 is obtained.

$$E[\bar{z}_k^{(1)}] = \qquad (6)$$

$$E\left[\frac{1}{M}\sum_{m=1}^{M}\left(e^{j\theta^{(1)}(t(2)-t(1))}|h_{m,k}^{(1)}|^2 + N\right)\right] = E\left[\frac{1}{M}\sum_{m=1}^{M}|h_{m,k}^{(1)}|^2\right]e^{j\theta^{(1)}(t(2)-t(1))}$$

In Expression (6), $$E\left[\frac{1}{M}\sum_{m=1}^{M}|h_{m,k}^{(1)}|^2\right]$$

is a real number, and has no influence on the phase. By calculating an average argument arg( ) of $$E[\bar{z}_k^{(1)}],$$

the phase rotation quantity between the first (l=1) and the second (l=2) reference signals is obtained.

$$\arg(E[\bar{z}_k^{(1)}]) = \theta^{(1)}(t(2)-t(1)) \qquad (7)$$

The right side of Expression (7) represents the product of the phase rotation by the frequency offset, and reception time difference between the first and the second reference signals, that is to say, the phase rotation quantity.

Based on this result, the estimation of the phase rotation per unit time $$\tilde{\theta}^{(1)}$$

is calculated as follows.

$$\tilde{\theta}^{(1)} = \frac{\arg(E[\bar{z}_k^{(1)}])}{t(2)-t(1)} \approx \frac{\theta^{(1)}(t(2)-t(1))}{t(2)-t(1)} = \theta^{(1)} \qquad (8)$$

Under the assumption that there is no interference, the phase rotation speed $\theta^{(1)}$ of the terminal "1" is time invariant, and sufficient statistics are obtained, it is understood that the estimation of the phase rotation per unit time (or phase rotation quantity per unit time)

$$\tilde{\theta}^{(1)}$$

converges on a correct result as illustrated in Expression (8).

The phase rotation per unit time has a proportional relationship with the frequency offset, for example. Accordingly, the phase rotation per unit time is estimated (or the phase rotation quantity per unit time is estimated) so that the frequency offset is estimated as follows.

$$\Delta\tilde{f}$$

That is to say, $$\Delta\tilde{f} = \frac{\tilde{\theta}^{(1)}}{2\pi(t(2)-t(1))} \qquad (9)$$

Accordingly, the frequency offset is estimated.

2. When there is an Interference Terminal

Next, a description will be given of the behavior of the frequency offset estimation when there is an interference terminal. When there is an interference terminal, the estimation described in the example of the above-described "1. When there is no interference terminal" will not hold. It is assumed that each element of the signal $y_{m,k,l}^{(1)}$ after the removal of the sequence of the terminal "1" illustrated by Expression (3) is simplified as follows.

$$S_{m,k,l}^{(1)} = e^{j\theta^{(1)}t(l)}h_{m,k}^{(1)} \qquad (10)$$

$$I_{m,k,l}^{(1)} = \sum_{u=2}^{U} e^{j\theta^{(u)}t(l)}h_{m,k}^{(u)}s_{k,l}^{(u)}s_{k,l}^{(1)*}$$

$$N_{m,k,l} = n'_{m,k,l}$$

$$y_{m,k,l}^{(1)} = S_{m,k,l}^{(1)} + I_{m,k,l}^{(1)} + N_{m,k,l}$$

In the same manner as the example in which there is no interference terminal, when a correlation between the first and the second signals after the removal of the sequence is calculated, the following is obtained.

$$\bar{z}_k^{(1)} = \frac{1}{M}\sum_{m=1}^{M} y_{m,k,1}^{(1)*}y_{m,k,2}^{(1)} = \qquad (11)$$

$$\frac{1}{M}\sum_{m=1}^{M}(S_{m,k,1}^{(1)} + I_{m,k,1}^{(1)} + N_{m,k,1})*(S_{m,k,2}^{(1)} + I_{m,k,2}^{(1)} + N_{m,k,2}) =$$

$$\frac{1}{M}\sum_{m=1}^{M}\left(S_{m,k,1}^{(1)*}S_{m,k,2}^{(1)} + S_{m,k,1}^{(1)*}I_{m,k,2}^{(1)} + I_{m,k,1}^{(1)*}S_{m,k,2}^{(1)} + N\right)$$

$$\tilde{\theta}^{(1)} = \frac{\arg(E[\bar{z}_k^{(1)}])}{t(2)-t(1)} = \frac{\arg\left(E\left[\frac{1}{M}\sum_{m=1}^{M}|h_{m,k}^{(1)}|^2\right]e^{j\theta^{(1)}(t(2)-t(1))} + \frac{1}{M}\sum_{m=1}^{M}E[S_{m,k,1}^{(1)*}I_{m,k,2}^{(1)} + I_{m,k,1}^{(1)*}S_{m,k,2}^{(1)}]\right)}{t(2)-t(1)} \qquad (12)$$

Here, N represented in Expression (11) is a term including white Gaussian noise, and is expected to converge to 0 by statistical operation. On the other hand, in Expression (12), for the term representing the influence of the interference $$\frac{1}{M}\sum_{m=1}^{M}E[S_{m,k,1}^{(1)*}I_{m,k,2}^{(1)} + I_{m,k,1}^{(1)*}S_{m,k,2}^{(1)}] \qquad (13)$$

if the transmission signal (or transmission sequence) $s_{k,l}^{(u)}$ of the terminal u and the propagation path $h_{m,k}^{(1)}$ have randomness, it is possible to reduce the influence of the interference terminal by statistical operation. However, in a state in which the transmission sequence $s_{k,l}^{(u)}$ is deterministic, or there are substantially no variations in the propagation path $h_{m,k}^{(1)}$, the term indicating the influence of interference (Expression (13)) exhibits a strong effect.

In order to remove the interference, the information on the interference terminal ought to be held in a base station in advance. However, if the base station does not hold the information on the interference terminal, it is not possible to remove the interference. Under such interference, depending on the term indicating the influence of the interference represented by Expression (13), the estimation $$\tilde{\theta}^{(1)}$$

of the phase rotation might result in a value that is completely different from a true solution $\theta^{(1)}$, and thus it becomes difficult to correctly estimate the frequency offset.

In the second embodiment, in order to correctly estimate the phase rotation quantity, or the frequency offset under such interference, the influence of the interference is determined by an evaluation value. Then at a point in time when the influence of the interference is small compared with the other time, the estimation result of the phase rotation is employed, and thus an attempt is made so as to get closer to the estimation result of the correct frequency offset as much as possible.

The evaluation value for determining the influence of the interference is calculated as follows, for example. That is to say, the evaluation value $R^{(1)}$ is calculated as follows based on the correlation values $$\bar{z}_1^{(1)}, \bar{z}_2^{(1)}$$

calculated using Expression (11), or the like in each section.

$$R^{(1)} = \begin{cases} |\arg(\bar{z}_1^{(1)}) - \arg(\bar{z}_2^{(1)})| & (\text{if } |\arg(\bar{z}_1^{(1)}) - \arg(\bar{z}_2^{(1)})| < \pi) \\ |\arg(\bar{z}_1^{(1)}) - \arg(\bar{z}_2^{(1)})| - \pi & (\text{otherwise}) \end{cases} \quad (14)$$

For the evaluation value $R^{(1)}$, as indicated in Expression (14), for example, the difference between the correlation value of a certain section "1" and the correlation value of the other section "2" is calculated. As described above, the phase rotation quantity between the two reference signals is calculated by the calculations of the correlation values. Accordingly, the evaluation value $R^{(1)}$ indicated by Expression (14) represents the difference between the two phase rotation quantities in the section "1" and the section "2", for example.

Then if the evaluation value $R^{(1)}$ is higher than a frequency offset estimation threshold value $\theta_{AFC}$, the difference between the two phase rotation quantities becomes less than a predetermined quantity. Accordingly, the influence of the interference is small, and removal processing, or the like of the frequency offset from the data signal is performed based on the estimated phase rotation quantity (for example).

On the other hand, if the evaluation value $R^{(1)}$ is less than or equal to the frequency offset estimation threshold value $\theta_{AFC}$, the difference between the two phase rotation quantities is larger than the fixed value, the influence of the interference is large, and thus the removal of the frequency offset from the data signal is not performed using the estimated phase rotation quantity.

The above-described evaluation value R represents the difference between the phase rotations estimated independently of the two sections, for example. The larger the difference, the more different the phase rotations estimated in the individual sections. The evaluation value R utilizes the quality in which the larger the influence of the interference, the more random the estimation of the phase rotation of each section, and the smaller the influence of the interference, the more fixed the estimation of the phase rotation of each section. The base station compares the evaluation value R with a predetermined threshold value (for example, frequency offset estimation threshold value $\theta_{AFC}$). If the base station has determined that the evaluation value R is higher than the threshold value, and the influence of the interference is less than a predetermined value, the base station performs estimation and update of the phase rotation quantity or the frequency offset per unit time. Also, if the evaluation value R is less than or equal to the threshold value, the base station determines that the influence of the interference has become larger than the predetermined value, and the base station does not estimate the frequency offset. Thereby, it is possible for the base station to obtain an estimation result of a correct frequency offset having reduced the influence of interference.

3. Application to PUCCH of LTE

Think of the case where the estimation method described above is applied to PUCCH of the LTE system. It is assumed that the transmission signal vector in the frequency domain of a terminal u, a slot k, and an OFDM symbol l is $s_{k,l}^{(u)}$. Assuming that U units of terminals transmit reference signals with the same frequency at the same timing, the reception signal vector $x_{m,k,l}^{(u)}$ in the frequency domain of an antenna m of the base station is represented as follows.

$$x_{m,k,l} = W(\Sigma_{u=1}^{U} e^{j\theta^{(u)}(l)} E^{(u)} H_k^{(u)} W^{-1} s_{k,l}^{(u)}) + n_{m,k,l} \quad (15)$$

Here, W represents the DFT matrix, $H_k^{(u)}$ represents the channel response matrix of the terminal u. In the PUCCH format2 of LTE, as illustrated in FIG. 2, a known reference signal sequence is transmitted using the OFDM symbols "$x_1$" and "$x_8$" in the first transmission section. The known reference signal is removed for the terminal u, and when terminal separation is carried out by orthogonal multiplexing, the following expression is calculated.

$$y_{m,k,l}^{(u)} = s_{k,l}^{(u)H} x_{m,k,l} \quad (16)$$

The signal $y_{m,k,l}^{(1)}$ after removal of sequence calculated by Expression (16) is applied to Expression (5) or Expression (11) so that a correlation between the signals ($y_{m,k,1}^{(u)}$, $y_{m,k,2}^{(u)}$) after removal of transmission sequence of the two transmission signals (l=1, 2) in the first transmission section (k=1) is calculated, and thus the phase rotation quantity of the first transmission section (or first half slot) is obtained. The phase rotation quantity of the second transmission section (or second half slot) is calculated in the same manner. By Expression (14), it becomes possible to calculate the difference between the phase rotation quantities of the two sections.

Example of Configuration of Wireless Base Station Apparatus

Figure 3:
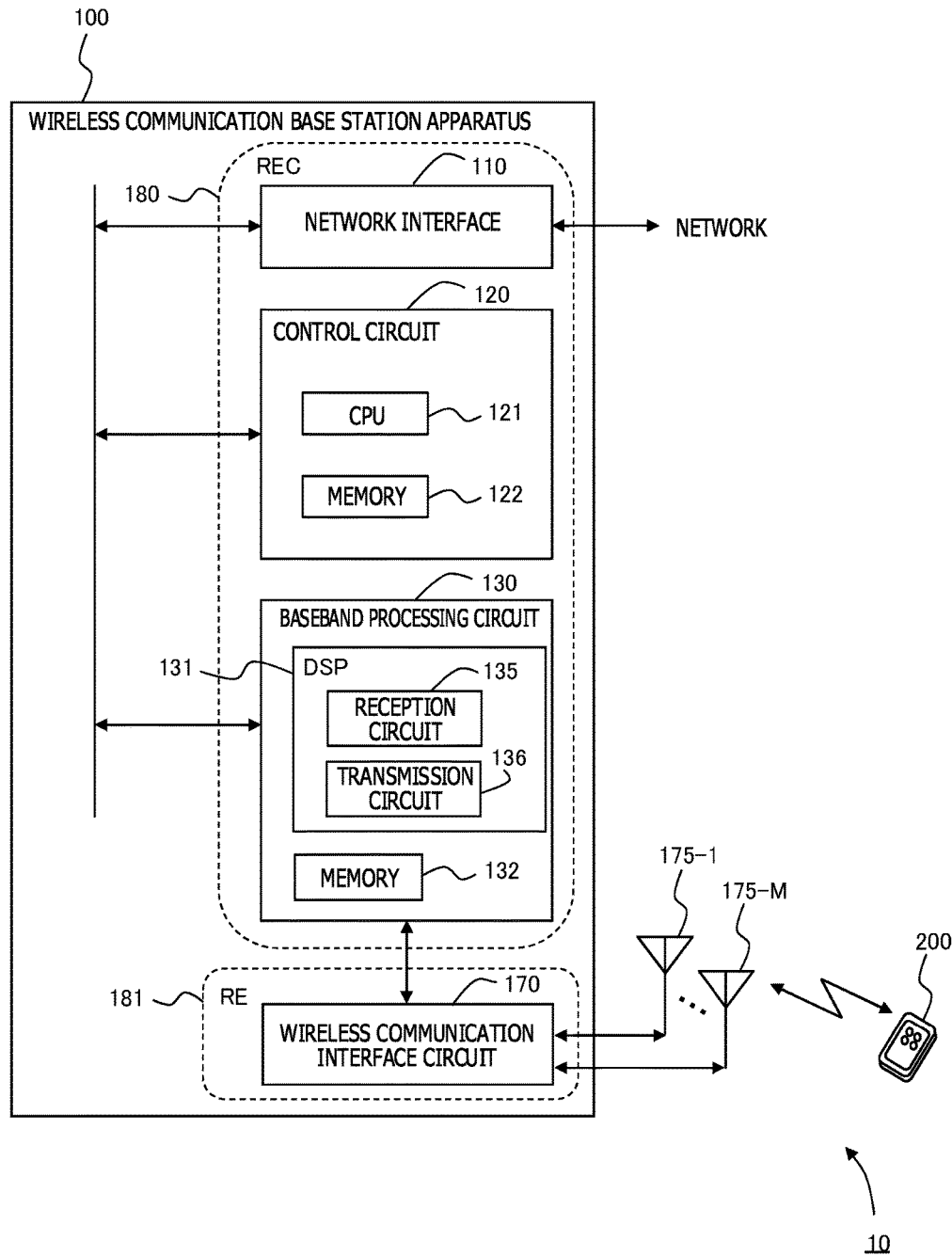
FIG. 3 is a diagram illustrating an example of a configuration of a wireless communication system including a base station.

Next, a description will be given of an example of a configuration of a wireless base station apparatus. FIG. 3 illustrates an example of a configuration of a wireless communication system 10 including an example of a configuration a base station 100.

The wireless communication system 10 includes a base station 100 and a terminal apparatus 200. In this regard, the communication apparatus 300 in the first embodiment corresponds to the base station 100, for example.

The terminal 200 is a portable communication apparatus, such as a feature phone, a smartphone, a personal computer, or the like, for example. In the second embodiment, the terminal 200 transmits a reference signal to the base station 100 using a known signal sequence. The base station 100 uses four reference signals having all the different transmission sequences at the time of estimation of the frequency offset, and thus the terminal 200 transmits the four reference signals like this to the base station 100.

The base station 100 is a communication apparatus capable of wirelessly communicating with the terminal 200 in the communication range of the base station 100. The base station 100 provides the terminal 200 with various services, such as a call service, a content distribution service, and the like. Also, the base station 100 receives a reference signal transmitted from the terminal 200, estimates the frequency offset, and performs AFC control based on the estimated frequency offset. The AFC control is processing, for example, for giving a phase rotation quantity in the direction opposite to the estimated phase rotation quantity to the received data signal so as to remove the frequency offset. By such processing, it is possible for the base station 100 to obtain the data signal from which the frequency offset is reduced.

The base station 100 includes a network interface service 110, a control circuit 120, a baseband processing circuit 130, a wireless interface circuit 170, and a plurality of antennas 175-1 to 175-M.

The network interface service 110 is a communication interface circuit for performing communication between an upper-level device, such as Mobility Management Entity (MME), Serving-Gateway (S-GW), and the like, and the base station 100.

The control circuit 120 performs overall control of the base station 100, for example. The control circuit 120 achieves the functions performed in the control circuit 120 by the CPU 121 and the memory 122. In this case, the CPU 121 reads a program stored in the memory 122, and executes the program so as to perform the functions carried out in the control circuit 120.

The baseband processing circuit 130 performs processing on the baseband signal. Also, the baseband processing circuit 130 performs estimation of the frequency offset, and the like.

The baseband processing circuit 130 includes a digital signal processor (DSP) 131 and a memory 132. The DSP 131 reads a program (for example, firmware) stored in the memory 132, and executes the program to achieve the functions carried out in the baseband processing circuit 130. In the third embodiment, the DSP 131 executes a program so as to achieve the functions of a reception circuit 135 and a transmission circuit 136. The estimation of the frequency offset, or the like is performed by the reception circuit 135, for example. A description will be given later of an example of a configuration (or an example of a configuration of functional blocks achieving each function) of the reception circuit 135. In this regard, the transmission circuit 136 may have a publicly known circuit configuration.

The wireless interface circuit 170 is a communication interface circuit for wireless communication between the base station 100 and the terminal 200.

A plurality of antennas 175-1 to 175-M transmit a radio signal received from the wireless interface circuit 170 to the terminal 200. Also, when the plurality of antennas 175-1 to 175-M receives the radio signal transmitted from the terminal 200, the plurality of antennas 175-1 to 175-M output the received radio signal to the wireless interface circuit 170. The plurality of antennas 175-1 to 175-M may be shared antennas that are shared with transmission and reception, or may be reception antennas partially or entirely.

In this regard, the base station 100 may include a Radio Equipment Control (REC) 180, and a Radio Equipment (RE) 181. The REC 180 includes a network interface service 110, a control circuit 120, and a baseband processing circuit 130. Also, the RE 181 includes a wireless interface circuit 170. The REC 180 and the RE 181 are coupled through an optical interface. In this case, the base station 100 may include a plurality of RE's, and the REC 180 may be coupled to a plurality of RE 181. Also, the REC 180 and the RE 181 may be disposed at locations that are a predetermined distance away with each other. The REC 180 is sometimes referred to as a baseband unit, and the RE 181 is sometimes referred to as a radio unit. For example, the communication apparatus 100 may include the REC 180, and may not include the RE 181.

Also, the base station 100 and the terminal 200 in the second embodiment may be the base station 100 and the terminal 200 that are used in a wireless communication system by the LTE system, respectively.

Example of Configuration of Reception Circuit

Figure 4:
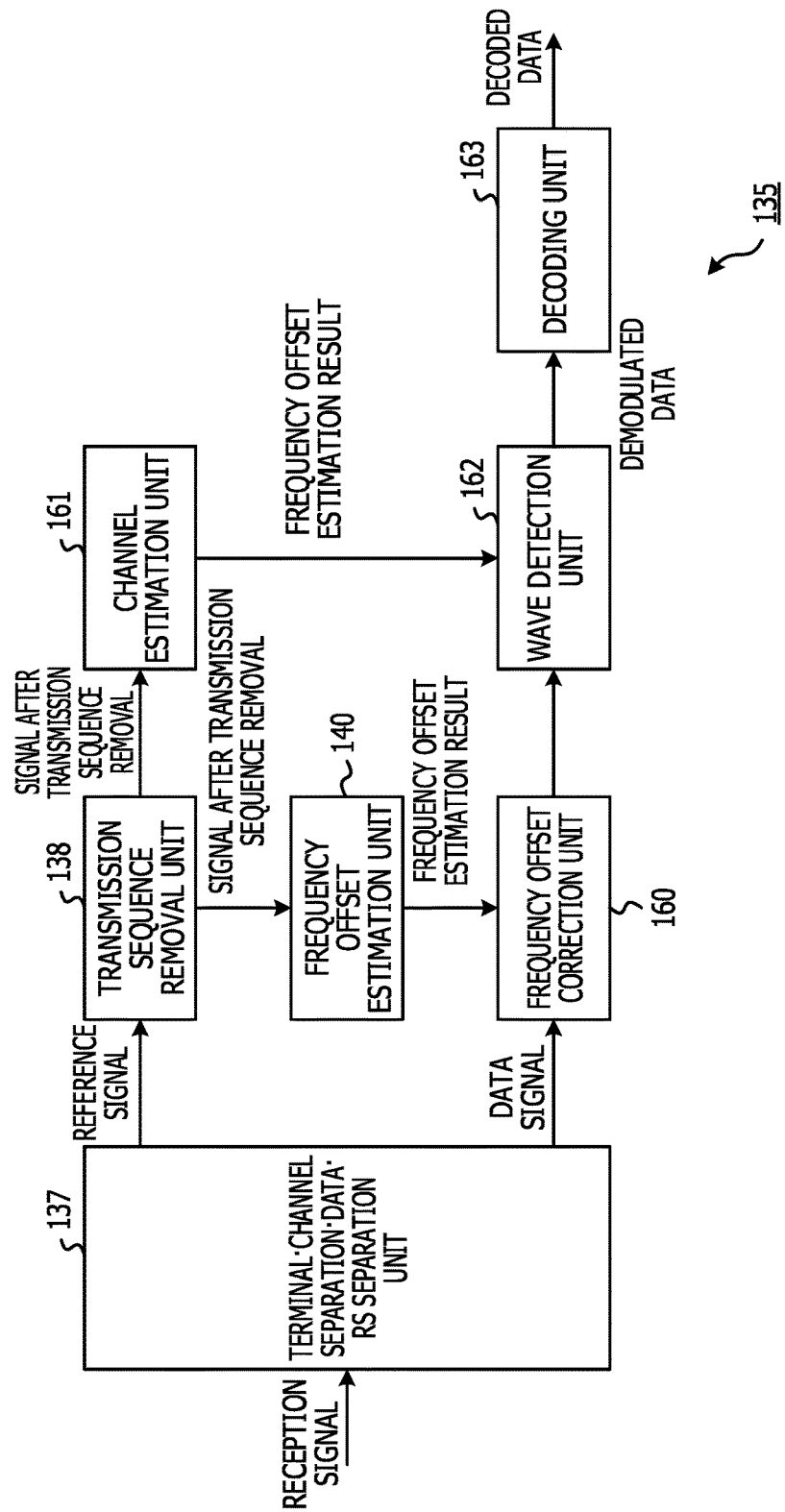
FIG. 4 is a diagram illustrating an example of a configuration of a reception circuit.

Next, a description will be given of an example of a configuration of the reception circuit 135. FIG. 4 illustrates an example of a configuration of the reception circuit 135. The reception circuit 135 includes a terminal•channel separation•data•RS separation unit (hereinafter referred to as an "RS separation unit") 137, a transmission sequence removal unit 138, a frequency offset estimation unit 140, a frequency offset correction unit 160, a channel estimation unit 161, a wave detection unit 162, and a decoding unit 163.

The RS separation unit 137 separates a reception signal received from the wireless interface circuit 170 for each terminal 200, and separates the reception signal of each terminal into a reference signal and a data signal.

For example, it is possible for the RS separation unit 137 to separate the reception signal received in the radio resource area of PUCCH as a reference signal, and the reception signal received in the radio resource area of Physical Uplink Shared Channel (PUSCH) as a data signal. When PUCCH is the PUCCH format2, as illustrated in FIG. 2, a reference signal is transmitted using the second and the sixth OFDM symbols of each slot in the time domain, and thus the signal received using the OFDM symbol may be used as a reference signal.

The RS separation unit 137 outputs the reference signal and the data signal to the transmission sequence removal unit 138 and the frequency offset correction unit 160, respectively.

The transmission sequence removal unit 138 generates a signal after removal of transmission sequence based on the received reference signal from the RS separation unit 137, and outputs the generated signal after removal of transmission sequence to the channel estimation unit 161 and the frequency offset estimation unit 140. In this case, it is possible for the transmission sequence removal unit 138 to calculate the signal after removal of transmission sequence by the above-described Expression (2).

Specifically, the transmission sequence removal unit 138 sets the received reference signal to the reception signal $x_{m,k,l}$, and removes the reference signal $s_{k,l}^{(1)}$ on the terminal "1" from the reception signal $x_{m,k,l}$ so as to calculate the signal $y_{m,k,l}^{(1)}$ after removal of transmission sequence on a certain terminal "1". The calculation expression is expressed in the above-described Expression (2), and in this case, a complex conjugate $s_{k,l}^{(1)*}$ of the reference signal $s_{k,l}^{(1)}$ on the terminal "1" is held in the memory, or the like in the transmission sequence removal unit 138, and is suitably read at the time of calculation processing. For the other terminals, the signals $y_{m,k,l}^{(u)}$ after removal of transmission sequence of the other terminals are calculated by suitably assigning a number other than "1" to u in Expression (2).

In this regard, the transmission sequence removal unit 138 calculates four signals after removal of transmission sequence for the four reference signals in total including the two reference signals in the first section, and the two reference signals in the second section.

Further, the transmission sequence removal unit 138 calculates signals after removal of transmission sequence for four reference signals for each one antenna, and calculates these for M times, which is the number of the reception antennas 175-1 to 175-M. Accordingly, the transmission sequence removal unit 138 calculates 4×M signals after removal of transmission sequence in total. The details will be described later.

The frequency offset estimation unit 140 calculates the evaluation value R based on the signal after removal of transmission sequence, and determines whether to estimate the frequency offset based on the evaluation value R (or whether to remove the frequency offset from the data signal). If the frequency offset estimation unit 140 determines to remove the frequency offset, the frequency offset estimation unit 140 outputs the phase rotation quantity calculated at this timing to the frequency offset correction unit 160 as a frequency offset estimation result. On the other hand, if the frequency offset estimation unit 140 determines not to remove the frequency offset, the frequency offset estimation unit 140 does not output the phase rotation quantity calculated at this timing to the frequency offset correction unit 160. A description will be given later of an example of a configuration of the frequency offset estimation unit 140.

The frequency offset correction unit 160 performs AFC control based on the frequency offset estimation result received from the frequency offset estimation unit 140. The channel estimation unit 161 performs channel estimation based on the signal after removal of transmission sequence. The wave detection unit 162 performs channel equalization on the data signal in accordance with the channel estimation value of the propagation path estimated by the channel estimation unit 161, and performs demodulation processing of the data. The decoding unit 163 performs error correction decoding processing on the demodulated data to obtain decoded data. The decoded data is transmitted to the network through the network interface service 110 under the control of the control circuit 120.

Frequency Offset Estimation Unit

Figure 5:
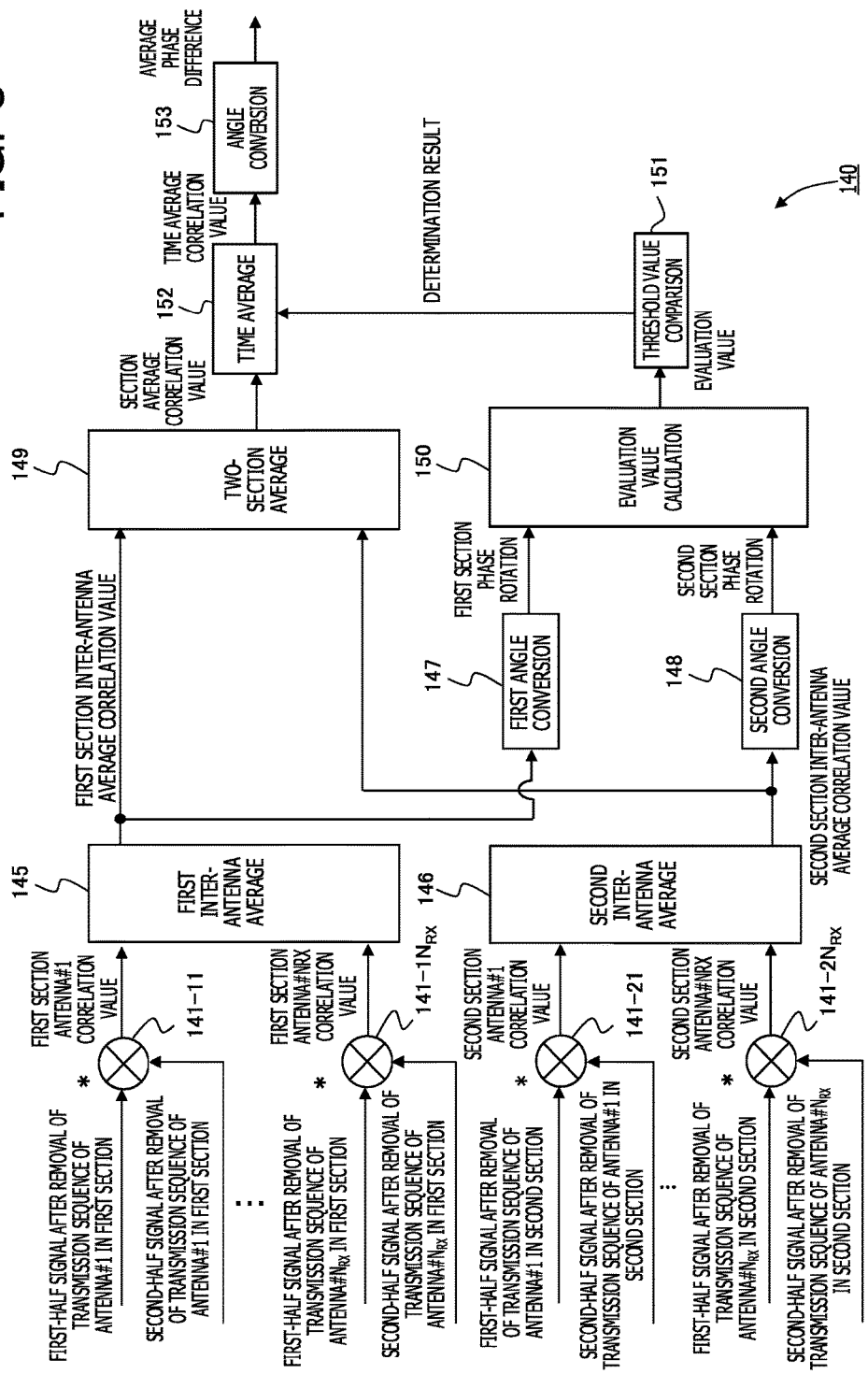
FIG. 5 is a diagram illustrating an example of a configuration of a frequency offset estimation unit.

Next, a description will be given of an example of a configuration of the frequency offset estimation unit 140. FIG. 5 is a diagram illustrating an example of a configuration of the frequency offset estimation unit 140.

The frequency offset estimation unit 140 includes a plurality of correlation calculation units 141-11 to 141-1N$_{RX}$ (N$_{RX}$ indicates the number of antennas, for example, N$_{RX}$=M), and 141-21 to 141-2N$_{RX}$. Also, the frequency offset estimation unit 140 includes first and second inter-antenna average units 145 and 146, first and second angle conversion units 147 and 148, a two-section average unit 149, an evaluation value calculation unit 150, a threshold value comparison unit 151, a time average unit 152, and a third angle conversion unit 153.

In FIG. 5, among the signals input into the correlation calculation unit 141-11, the first half of the signal after removal of transmission sequence of the antenna #1 in the first section is the signal after removal of transmission sequence generated based on the first (l=1) reference signal included in the first section.

Also, the second half of the signal after removal of transmission sequence of the antenna #1 in the first section is the signal after removal of transmission sequence generated based on the second (l=2) reference signal included in the first section.

Accordingly, the correlation calculation unit 141-11 calculates the correlation value between the two signals after removal of transmission sequence generated based on the two reference signals received by the antenna #1 in the first section. For example, the phase rotation quantity of the two reference signals in the first section is calculated by the correlation value. The correlation calculation unit 141-11 performs the correlation calculation (note that m=1, k=1, l=1) using the expression represented by Expression (2), for example.

Accordingly, the correlation calculation units 141-11 to 141-1N$_{RX}$ individually calculate the correlation value (first section antenna #1 correlation value to first section antenna #N$_{RX}$ correlation value) of the two signals after removal of transmission sequence generated based on the two reference signals in the first section, received by the antennas #1 to #N$_{RX}$, respectively.

On the other hand, the correlation calculation units 141-21 to 141-2N$_{RX}$ individually calculate the correlation value (second section antenna #1 correlation value to second section antenna #N$_{RX}$ correlation value) of the two signals after removal of transmission signal sequence that are generated based on the two reference signals in the second section, received by the antennas #1 to #N$_{RX}$, respectively.

In this regard, each unit 145, and the like in the frequency offset estimation unit 140 holds each expression, such as Expression (1) to Expression (16), and the like, for example, in an internal memory of each unit 145, and the like, and is capable of suitably reading each expression and executing the expression to perform calculation by each expression.

The first inter-antenna average unit 145 individually receives the first section antenna #1 correlation value to the first section antenna #N$_{RX}$ correlation value from the plurality of correlation calculation units 141-11 to 141-1N$_{RX}$, and calculates the average using the number of the antennas 175-1 to 175-M. Thereby, the first inter-antenna average unit 145 calculates an inter-antenna average correlation value in the first section. The first inter-antenna average unit 145 calculates the inter-antenna average correlation value using Expression (5), for example (note that k=1).

Also, the second inter-antenna average unit 146 individually receives the second section antenna #1 correlation value to the second section antenna #N$_{RX}$ correlation value from the plurality of correlation calculation unit 141-21 to 141-2N$_{RX}$, and calculates the average using the number of the antennas 175-1 to 175-M. Thereby, the second inter-antenna average unit 146 calculates an inter-antenna average correlation value in the second section. The second inter-antenna average unit 146 calculates an inter-antenna average correlation value in the second section, using Expression (5), for example (note that k=2).

The first angle conversion unit 147 receives the inter-antenna average correlation value in the first section from the first inter-antenna average unit 145, and calculates a first section phase rotation quantity. The first angle conversion unit 147 calculates the first section phase rotation quantity using Expression (7), for example, (note that k=1).

Also, the second angle conversion unit 148 receives the inter-antenna average correlation value in the second section from the second inter-antenna average unit 146, and calculates a second section phase rotation quantity. The second angle conversion unit 148 calculates the second section phase rotation quantity using Expression (7), for example (note that k=2).

The two-section average unit 149 receives the inter-antenna average correlation value in the first section, and the inter-antenna average correlation value in the second section from the first inter-antenna average unit 145, and the second inter-antenna average unit 146, respectively, and calculates the average of these values.

The evaluation value calculation unit 150 receives the first section phase rotation quantity and the second section phase rotation quantity from the first angle conversion unit 147 and the second angle conversion unit 148, respectively, and calculates an evaluation value R. The evaluation value calculation unit 150 calculates the evaluation value R using Expression (14), for example (u=1, and the like).

The threshold value comparison unit 151 receives the evaluation value R from the evaluation value calculation unit 150, compares the evaluation value R with the frequency offset estimation threshold value $\theta_{AFC}$, and outputs a determination result (or comparison result).

The time average unit 152 performs time average processing or does not perform time average processing on the section average correlation value output from the two-section average unit 149 in accordance with the determination result received from the threshold value comparison unit 151. The time average unit 152 performs the time average processing using the following expression, for example.

$$z_{avg} = \mu z_{avg} + (1-\mu)((\bar{z}_1 + \bar{z}_2)/2) \quad (17)$$

$Z_{avg}$ is sometimes referred to as a time average correlation value.

For example, when the time average unit 152 obtains the evaluation result indicating that the evaluation value R is higher than the frequency offset estimation threshold value $\theta_{AFC}$, the time average unit 152 determines to remove the frequency offset, and calculates the time average correlation value $Z_{avg}$ on the section average correlation value using Expression (17). On the other hand, when the time average unit 152 obtains the evaluation result indicating that the evaluation value R is less than or equal to the frequency offset estimation threshold value $\theta_{AFC}$, the time average unit 152 determines not to remove the frequency offset, and does not calculate the time average correlation value $Z_{avg}$. In this case, the time average unit 152 may discard the section average correlation value received from the two-section average unit 149.

The third angle conversion unit 153 performs angle conversion on the time average correlation value $Z_{avg}$ received from the time average unit 152, and calculates the average phase rotation quantity. The third angle conversion unit 153 calculates the average phase rotation quantity $\theta$ using the following expression, for example.

$$\theta = \arg(z_{avg}) \quad (18)$$

The frequency offset estimation unit 140 outputs the average phase difference $\theta$ to the frequency offset correction unit 160 as an estimation result of the frequency offset. The frequency offset correction unit 160 gives the phase rotation quantity having the opposite direction to that of the average phase rotation quantity $\theta$ to the data signal to remove the frequency offset.

Operation Example

Figure 6:
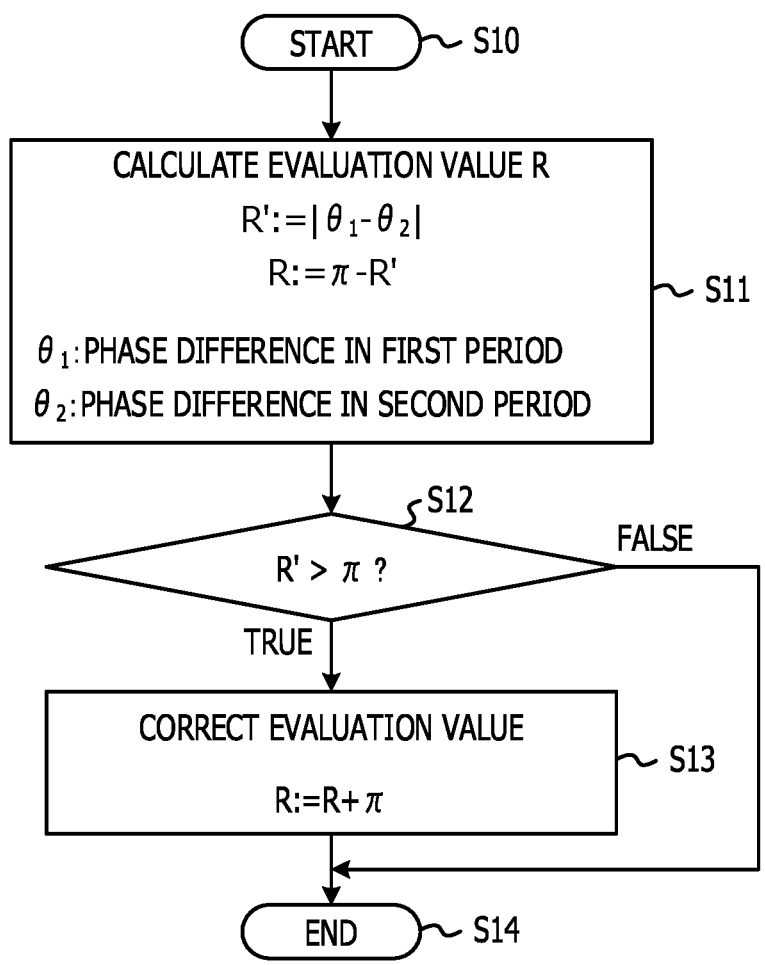
FIG. 6 is a flowchart illustrating an operation example of evaluation value calculation processing.
Figure 7:
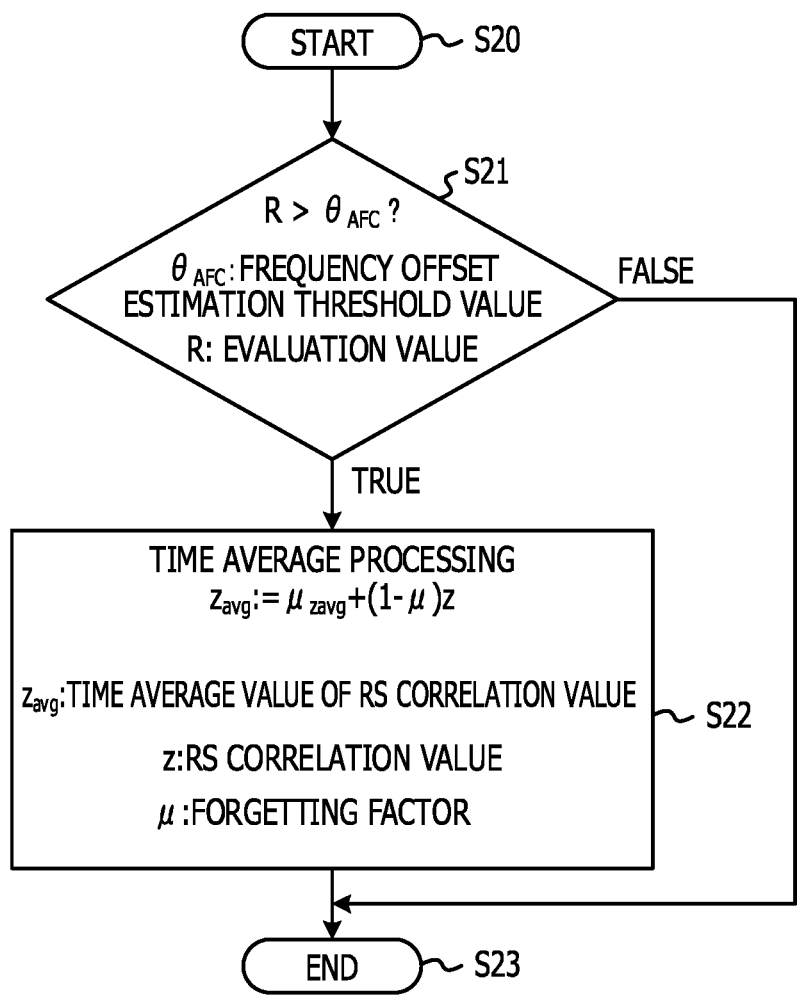
FIG. 7 is a flowchart illustrating an operation example of comparison processing and time average processing.

Next, a description will be given of operation example of the base station 100. FIG. 6 and FIG. 7 illustrate an operation example from the calculation of the evaluation value R to the comparison with the frequency offset estimation threshold value $\theta_{AFC}$ and obtaining the time average value. Out of these, FIG. 6 is a flowchart illustrating an example of a method of calculating the evaluation value R.

When the evaluation value calculation unit 150 starts processing (S10), the evaluation value calculation unit 150 calculates the evaluation value R (S11). For example, the evaluation value calculation unit 150 calculates the phase difference $\theta_1(\arg(z_1))$ of the two reference signals in the first section, and the phase difference $\theta_2(\arg(z_2))$ of the two reference signals in the second section using Expression (14), and obtains R' by the difference value. In this regard, in this processing, the evaluation value calculation unit 150 obtains the evaluation value R by R=$\pi$−R'. For example, if the rotation quantity of the inter-antenna average correlation is greater than $\pi$, the evaluation value calculation unit 150 keeps the evaluation value R within the range of less than or equal to $\pi$.

Next, the frequency offset estimation unit 140 determines whether the calculated R' is higher than $\pi$ or not (S12).

If the calculated R' is higher than $\pi$ ("True" in S12), the frequency offset estimation unit 140 corrects the evaluation value R, and adds $\pi$ to the evaluation value R calculated in S11. Then the frequency offset estimation unit 140 terminates a series of processing (S14).

On the other hand, if the calculated R' is less than or equal to $\pi$ ("False" in S12), the frequency offset estimation unit 140 does not correct the evaluation value R, and terminates the series of processing (S14).

FIG. 7 is a flowchart illustrating an example in which the evaluation value R is compared with the frequency offset estimation threshold value $\theta_{AFC}$, and the time average value is obtained.

When the threshold value comparison unit 151 starts processing (S20), the threshold value comparison unit 151 determines whether the evaluation value R is higher than the frequency offset estimation threshold value $\theta_{AFC}$ (S21).

If the evaluation value R is higher than the frequency offset estimation threshold value $\theta_{AFC}$ ("True" in S21), a determination is made to remove the frequency offset (or to perform estimation of the frequency offset), and the time average unit 152 calculates the time average value of the correlation values (S22). For example, the time average unit 152 calculates the time average correlation value using Expression (17). After that, the third angle conversion unit 153 calculates the average phase difference on the time average correlation value using Expression (18), and obtains the estimation result of the frequency offset. Then the frequency offset estimation unit 140 terminates a series of processing (S23).

On the other hand, if the evaluation value R is less than or equal to the frequency offset estimation threshold value $\theta_{AFC}$ ("False" in S21), a determination is made not to remove the frequency offset (or not to perform estimation of the frequency offset), and the time average unit 152 does not calculate the time average correlation value.

Figure 8A:
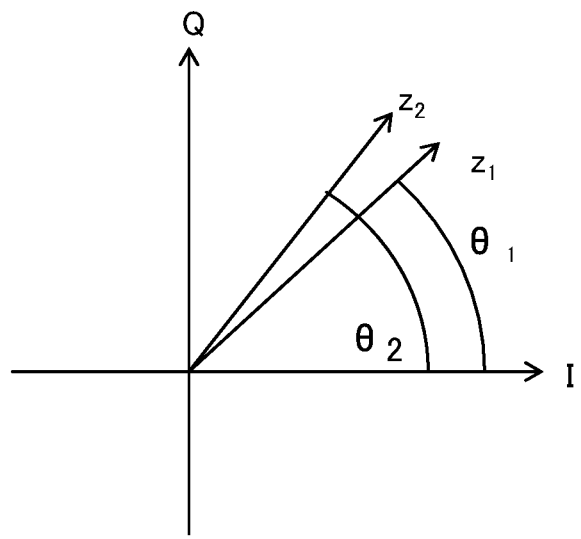
FIG. 8A and FIG. 8B are graphs illustrating an example of phase rotation quantities of inter-antenna average correlation values.

FIG. 8A illustrates an example of the two inter-antenna average correlation values $z_1$ and $z_2$ in the first section and the second section, respectively, when the evaluation value R is higher than the frequency offset estimation threshold value $\theta_{AFC}$. In the example in FIG. 8A, the difference (note that the difference is less than or equal to $\pi$) between the phase rotation quantity $\theta_1$ of the inter-antenna average correlation value $z_1$ in the first section and the phase rotation quantity $\theta_2$ of the inter-antenna average correlation value $z_2$ in the second section is less than the predetermined quantity. In this case, the base station determines that it is the timing when the influence of the interference is less than a predetermined case. Then base station 100 determines to use the two phase rotation quantities $\theta_1$ and $\theta_2$, to remove the frequency offset from the data signal, and removes the frequency offset.

Figure 8B:
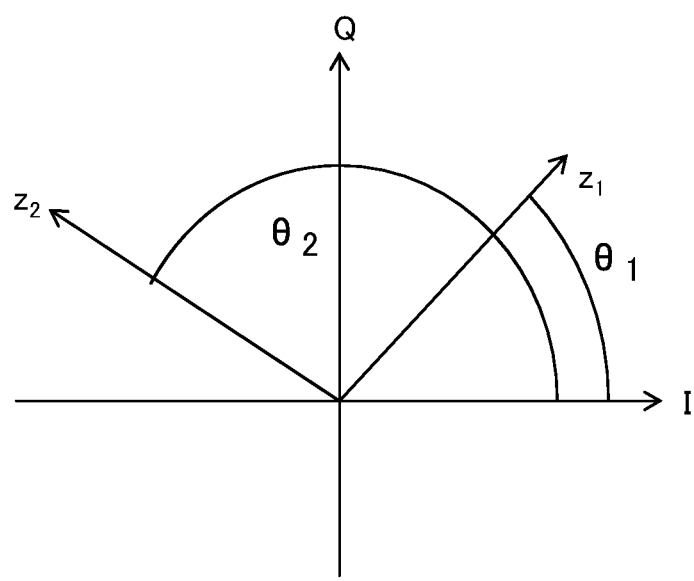

On the other hand, FIG. 8B illustrates the example of when the evaluation value R is less than the frequency offset estimation threshold value $\theta_{AFC}$. In this case, the difference between the phase rotation quantity $\theta_1$ of the inter-antenna average correlation value $z_1$ in the first section, and the phase rotation quantity $\theta_2$ of the inter-antenna average correlation value $z_2$ in the second section is equal to or larger than the predetermined quantity (note that in FIG. 8B the difference between $\theta_1$ and $\theta_2$ is less than $\pi$). In this case, the base station determines that it is the timing when the influence of the interference is greater than that of the predetermined case. Then the base station 100 determines not to use the two phase rotation quantities $\theta_1$ and $\theta_2$ to remove the frequency offset from the data signal, and cancels the estimation of the frequency offset and the removal of the frequency offset.

In this regard, to what value the frequency offset estimation threshold value $\theta_{AFC}$ is set may be determined may be determined for each of the base stations 100 by various simulations, for example.

In the second embodiment, whether to remove the frequency offset from reception signal (for example, data signal) or not is determined based on the difference between the phase rotation quantity of the two reference signals received in the first section, and the phase rotation quantity of the two reference signals received in the second section.

For example, if the difference of the phase rotation quantities in the two sections is less than a predetermined quantity (or threshold value) (or the evaluation value R is higher than the frequency offset estimation threshold value $\theta_{AFC}$), the base station 100 determines that it is the timing when the influence of the interference is less than that of the predetermined case. In this case, the base station 100 uses the phase rotation quantities in the two sections estimated at this timing for removing the frequency offset.

On the other hand, for example, if the difference of the phase rotation quantities in the two sections is equal to or more than a predetermined quantity (or the evaluation value R is less than or equal to the frequency offset estimation threshold value $\theta_{AFC}$), the base station 100 determines that it is the timing when the influence of the interference is greater than the predetermined case. In this case, the base station 100 does not use the phase rotation quantities in the two sections estimated at this timing for removing the frequency offset.

Thereby, for example, if the influence of the interference is greater than the predetermined case, the estimation of the frequency offset is canceled, whereas if the influence of the interference is less than or equal to the predetermined case, the frequency offset is removed.

Accordingly, it is possible for a communication apparatus according to the second embodiment to correctly estimate the frequency offset against interference, and to correctly remove the frequency offset from the reception signal.

Other Embodiments

In the above-described second embodiment, a description has been given of the example in which the terminal 200 transmits a reference signal, the base station 100 receives this signal, and the base station 100 performs estimation of the frequency offset and removal of the frequency offset. However, for example, the base station 100 may transmit a reference signal, and the terminal 200 may estimate the frequency offset or remove the frequency offset.

Figure 9:
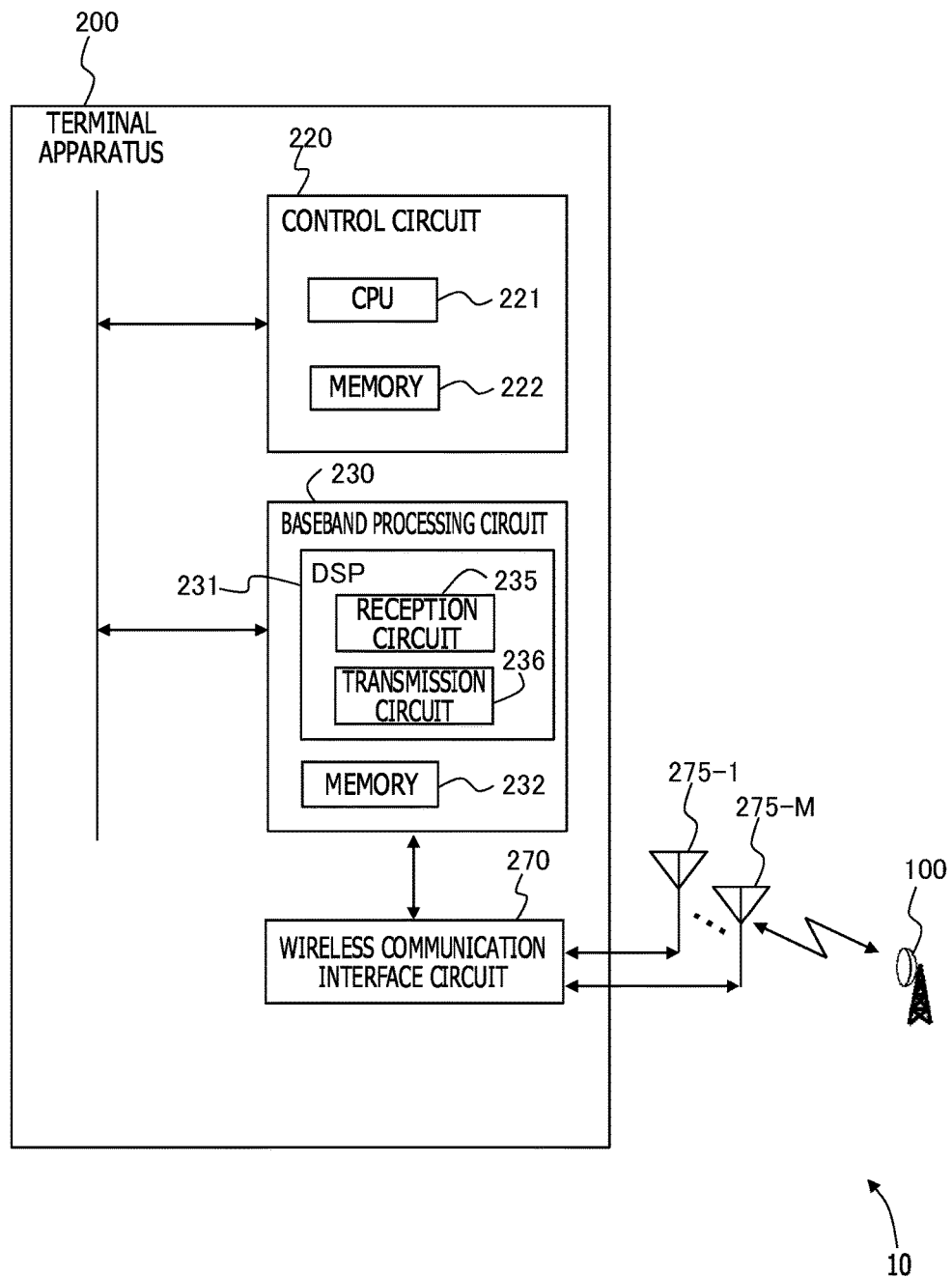
FIG. 9 is a diagram illustrating an example of a configuration of a wireless communication system including a terminal.

FIG. 9 is a diagram illustrating an example of a configuration of a wireless communication system 10 in this case. The terminal 200 includes a control circuit 220, a baseband processing circuit 230, and a wireless interface circuit 270. The baseband processing circuit 230 includes a DSP 231, and the DSP 231 achieves the function of the reception circuit 235. An example of a configuration of the reception circuit 235 is illustrated in FIG. 4, for example. By the reception circuit 235 like this, it is possible to correctly estimate the frequency offset, and correctly remove the frequency offset from the data signal against interference in the same manner as the second embodiment, for example.

For example, the control circuit 220 of the terminal 200 corresponds to the control circuit 120 in the second embodiment, and the baseband processing circuit 230 of the terminal 200 corresponds to the baseband processing circuit 130 in the second embodiment. Also, the wireless interface circuit 270 corresponds to the wireless interface circuit 170 in the second embodiment. Further, the terminal 200 corresponds to the communication apparatus 300 in the first embodiment, for example.

Also, in the above-described embodiment, a description has been given by taking Expression (14) as an example of the evaluation value R. The evaluation value R may be a value as follows, for example.

$$R^{(1)} = \frac{|z_1^{(1)} - z_2^{(1)}|}{|\bar{z}_1^{(1)} - \bar{z}_2^{(1)}|} \quad (19)$$

It is possible to regard the above-described evaluation value R as a value produced by normalizing the difference of the correlation values of the signals after removal of sequence in the individual sections by the amplitude of the section average correlation value. The smaller the difference of the correlation values of the signals after removal of sequence in the individual sections, which is the numerator, it is expected that there is the higher possibility of correct estimation of the frequency offset with the smaller influence of the interference. Also, the larger the amplitude (two times of) of the section average correlation value, which is the denominator, it is expected that there is the higher possibility of correct estimation than the other cases. Expression (19) indicates, for example, the ratio of the difference of the correlation values of signals after removal of sequence (or reference signals) to the amplitude of the correlation value of the signal after removal of sequence (or reference signal).

The base station 100 compares the evaluation value indicated by Expression (19) with a predetermined threshold value (for example, the frequency offset estimation threshold value $\theta_{AFC}$). If the evaluation value is less than or equal to the threshold value, the base station 100 determines that it is the timing when the influence of the interference is smaller than that of the other cases. In this case, the base station performs estimation and update of the phase rotation quantity or the frequency offset so that it becomes possible to correctly remove the frequency offset from the reception signal.

In the above-described embodiment, a description has been given of the example in which the base station 100 calculates an average based on the average correlation values in the two sections $$\bar{z}_1^{(1)}, \bar{z}_2^{(1)}$$

using Expression (17), or the like to output the estimation result of the frequency offset. However, for example, either one of the two average correlation values $$\bar{z}_1^{(1)}, \bar{z}_2^{(1)}$$

may be used to obtain the estimation result of the frequency offset. In this case, it is possible for the base station 100 to obtain the estimation result of the frequency offset by setting $Z_{avg}$ in Expression (18) to either one of the average correlation values without using Expression (17). The calculation of Expression (17) is not performed, and thus it is possible to improve the processing speed compared with the above-described embodiment.

Also, in the above-described embodiment, a description has been given of the example of the PUCCH format2. However, for example, formats other than the PUCCH format2, for example, the PUCCH format2a, the PUCCH format 2b, PUCCH format1, PUCCH format1a, PUCCH format1b, or the like may be used.

Also, in the above-described embodiment, a description has been given of the example of the reference signal. However, a pilot signal, or the like may be used, or a known signal sequence may be used.

Further, in the above-described embodiment, a description has been given of the example in which the first section is the first half slot, and the second section is the second half slot in the same subframe. However, for example, the second section may be the second half slot of the next subframe to the subframe of the first section. For example, as long as the first section and the second section are different time sections in one wireless frame, any sections (or slot) may be used.

Further, in the above-described embodiment, a description has been given of the example in which the positions of the two transmission symbols used for transmitting two reference signals in each section are the second and the sixth symbols from the left. However, the reference signals transmitted using the symbols of different positions in each section, for example, the first and the fifth symbols from the left in the first section, the third and the seventh symbols from the left in the second section, or the like may be used.

Further, in the above-described embodiment, a description has been given of the example in which the baseband processing circuits 130 and 230 include the DSP 131 and the DSP 231, respectively. However, for example, in place of the DSP 131 and the DSP 231, a controller, such as a field programmable gate array (FPGA), a CPU, or the like may be used.

All examples and conditional language recited herein are intended for pedagogical purposes to aid the reader in understanding the present disclosure and the concepts contributed by the inventor to furthering the art, and are to be construed as being without limitation to such specifically recited examples and conditions, nor does the organization of such examples in the specification relate to a showing of the superiority and inferiority of the present disclosure. Although the embodiments of the present disclosure have been described in detail, it should be understood that the various changes, substitutions, and alterations could be made hereto without departing from the spirit and scope of the present disclosure.

What is claimed is:

1. A communication apparatus comprising:
a memory; and
a processor coupled to the memory and configured to:
receive a first reception signal at a first timing and a second reception signal at a second timing different from the first timing, the first timing and the second timing being included in a first period,
calculate a first phase rotation quantity between the first reception signal and the second reception signal,
receive a third reception signal at a third timing and a fourth reception signal at a fourth timing different from the third timing, the third timing and the fourth timing being included in a second period after the first period,
calculate a second phase rotation quantity between the third reception signal and the fourth reception signal,
calculate a difference between the first phase rotation quantity and the second chase rotation quantity,
determine whether to compensate for a frequency offset in a fifth reception signal based on the difference between the first phase rotation quantity and the second phase rotation quantity, and
when it is determined to compensate for the frequency offset in the fifth reception signal, compensate for the frequency offset in the fifth reception signal,
wherein a first time difference between the first timing and the second timing is equal to a second time difference between the third timing and the fourth timing.

2. The communication apparatus according to claim 1, wherein the processor is further configured not to compensate for the frequency offset of the fifth reception signal when the difference is equal to or more than a certain value, and to compensate for the frequency offset in the fifth reception signal using the first phase rotation quantity and the second phase rotation quantity when the difference is less than the certain value.

3. The communication apparatus according to claim 2, wherein the processor is further configured to:
calculate an average phase rotation quantity by averaging the first phase rotation quantity and the second phase rotation quantity, and
add a correction phase rotation quantity, the correction phase rotation quantity being a same quantity as the average phase rotation quantity and having a direction opposite to a direction of the average phase rotation quantity to the fifth reception signal.

4. The communication apparatus according to claim 1, further comprising:
a first reception antenna; and
a second reception antenna,
wherein the processor is configured to:
calculate the first phase rotation quantity by averaging a third phase rotation quantity between the first reception signal and the second reception signal received in the first period using the first reception antenna and a fourth phase rotation quantity between the first reception signal and the second reception signal received in the first period using the second reception antenna, and
calculate the second phase rotation quantity by averaging a fifth phase rotation quantity between the third reception signal and the fourth reception signal received in the second period using the first reception antenna and a sixth phase rotation quantity between the third reception signal and the fourth reception signal received in the second period using the second reception antenna.

5. The communication apparatus according to claim 1, wherein the processor is further configured to:
calculate the first phase rotation quantity by correlation based on the first reception signal and the second reception signal, and
calculate the second phase rotation quantity by correlation based on the third reception signal and the fourth reception signal.

6. The communication apparatus according to claim 1, wherein the processor is further configured to determine whether to compensate for the frequency offset in the fifth reception signal based on a ratio of the difference between the first phase rotation quantity and the second phase rotation quantity to amplitudes of the first phase rotation quantity and the second phase rotation quantity.

7. The communication apparatus according to claim 1, wherein the first reception signal, the second reception signal, the third reception signal, and the fourth reception signal respectively include a known first signal sequence, a known second signal sequence, a known third signal sequence, and a known fourth signal sequence received from the other communication apparatus.

8. The communication apparatus according to claim 7, wherein the processor is further configured to:
   remove the known first signal sequence from the first reception signal,
   remove the known second signal sequence from the second reception signal,
   remove the known third signal sequence from the third reception signal, and
   remove the known fourth signal sequence from the fourth reception signal.

9. The communication apparatus according to claim 1, wherein the first reception signal, the second reception signal, the third reception signal, and the fourth reception signal individually include a reference signal, respectively, and the fifth reception signal comprises a data signal.

10. The communication apparatus according to claim 1, wherein the communication apparatus comprises a base station apparatus or a terminal apparatus.

11. A communication method comprising:
   receiving a first reception signal at a first timing and a second reception signal at a second timing different from the first timing, the first timing and the second timing being included in a first period;
   calculating a first phase rotation quantity between the first reception signal and the second reception signal;
   receiving a third reception signal at a third timing and a fourth reception signal at a fourth timing different from the third timing, the third timing and the fourth timing being included in a second period after the first period;
   calculating a second phase rotation quantity between the third reception signal and the fourth reception signal;
   calculating a difference between the first phase rotation quantity and the second phase rotation quantity;
   determining whether to compensate for a frequency offset in a fifth reception signal based on the difference between the first phase rotation quantity and the second phase rotation quantity; and
   when it is determined to compensate for the frequency offset in the fifth reception signal, compensating for the frequency offset in the fifth reception signal,
   wherein a first time difference between the first timing and the second timing is equal to a second time difference between the third timing and the fourth timing.

12. The communication method according to claim 11, the communication method further comprising:
   when the difference is equal to or greater than a certain value, not compensating for the frequency offset in the fifth reception signal using the first phase rotation quantity and the second phase rotation quantity, and
   when the difference is less than the certain value, compensating for the frequency offset in the fifth reception signal using the first phase rotation quantity and the second phase rotation quantity.

13. The communication method according to claim 12, the communication method further comprising:
   calculating an average phase rotation quantity by averaging the first phase rotation quantity and the second phase rotation quantity; and
   adding a correction phase rotation quantity, the correction phase rotation quantity being same quantity as the average phase rotation quantity and having a direction opposite to a direction of the average phase rotation quantity to the fifth reception signal.

14. The communication method according to claim 11, wherein the communication method is executed by a communication apparatus including a first reception antenna and a second reception antenna, and
   the communication method further comprising:
   calculating the first phase rotation quantity by averaging a third phase rotation quantity between the first reception signal and the second reception signal received in the first period using the first reception antenna and a fourth phase rotation quantity between the first reception signal and the second reception signal received in the first period using the second reception antenna; and
   calculating the second phase rotation quantity by averaging a fifth phase rotation quantity between the third reception signal and the fourth reception signal received in the second period using the first reception antenna and a sixth phase rotation quantity between the third reception signal and the fourth reception signal received in the second period using the second reception antenna.

15. The communication method according to claim 11, the communication method further comprising:
   calculating the first phase rotation quantity by correlation based on the first reception signal and the second reception signal; and
   calculating the second phase rotation quantity by correlation based on the third reception signal and the fourth reception signal.

16. The communication method according to claim 11, the communication method further comprising:
   determining whether to compensate for the frequency offset in the fifth reception signal based on a ratio of the difference between the first phase rotation quantity and the second phase rotation quantity to amplitudes of the first phase rotation quantity and the second phase rotation quantity.

17. The communication method according to claim 11, wherein the communication first reception signal, the second reception signal, the third reception signal, and the fourth reception signal respectively include a known first signal sequence, a known second signal sequence, a known third signal sequence, and a known fourth signal sequence received from the other communication method.

18. The communication apparatus according to claim 1, wherein the second period is configured to immediately follow the first period, the first and second periods comprising a subframe in accordance with a telecommunication standard.

19. The communication apparatus according to claim 18, wherein the telecommunication standard comprises a long term evolution (LTE) or LTE-Advanced (LTE-A), and
   wherein the first period and the second period are each configured to include seven orthogonal frequency division multiplexing (OFDM) symbols.

20. A communication system comprising:
   a terminal device; and
   a base station device including a memory and a processor coupled to the memory, wherein the processor is configured to:
   receive a first reception signal at a first timing and a second reception signal at a second timing different from the first timing from the terminal device, the first timing and the second timing being included in a first period of time,
   calculate a first phase rotation quantity between the first reception signal and the second reception signal,
   receive a third reception signal at a third timing and a fourth reception signal at a fourth timing different from the third timing from the terminal device, the third timing and the fourth timing being included in a second period of time after the first period of time, calculate a second phase rotation quantity between the third reception signal and the fourth reception signal, calculate a difference between the first phase rotation quantity and the second phase rotation quantity, determine whether to compensate for a frequency offset in a fifth reception signal based on the difference between the first phase rotation quantity and the second phase rotation quantity, and when it is determined to compensate for the frequency offset in the fifth reception signal, compensate for the frequency offset in the fifth reception signal, and wherein a first time difference between the first timing and the second timing is equal to a second time difference between the third timing and the fourth timing.

21. The communication system according to claim 20, wherein the communication system comprises a long term evolution (LTE) system or a LTE-Advanced (LTE-A) system.

* * * * *